United States Patent
Rytter

(10) Patent No.: US 12,188,448 B2
(45) Date of Patent: Jan. 7, 2025

(54) JACKET TYPE WIND TURBINE FOUNDATION AND METHODS FOR CONSTRUCTION THEREOF

(71) Applicant: Leicon ApS, Horsens (DK)

(72) Inventor: Frederik Rytter, Viborg (DK)

(73) Assignee: Leicon ApS, Horsens (DK)

( * ) Notice: Subject to any disclaimer, the term of this patent is extended or adjusted under 35 U.S.C. 154(b) by 0 days.

(21) Appl. No.: 18/206,734

(22) Filed: Jun. 7, 2023

(65) Prior Publication Data
US 2023/0313780 A1    Oct. 5, 2023

Related U.S. Application Data

(63) Continuation of application No. PCT/DK2021/050371, filed on Dec. 16, 2021.

(30) Foreign Application Priority Data

Dec. 16, 2020 (DK) .......................... PA 2020 01409

(51) Int. Cl.
*F03D 13/20* (2016.01)
*F03D 13/10* (2016.01)
*F03D 13/25* (2016.01)

(52) U.S. Cl.
CPC ............ *F03D 13/22* (2016.05); *F03D 13/10* (2016.05); *F03D 13/25* (2016.05); *F05B 2240/9121* (2013.01); *F05B 2260/301* (2013.01)

(58) Field of Classification Search
CPC .......... F03D 13/22; F03D 13/10; F03D 13/25; F05B 2240/9121; F05B 2260/301;
(Continued)

(56) References Cited

U.S. PATENT DOCUMENTS 3,486,737 A  * 12/1969 Campbell ............. E21B 15/003
                                                 254/106
10,302,070 B2    5/2019  Donescu et al.
(Continued)

FOREIGN PATENT DOCUMENTS

CN    103032276 A    4/2013
CN    106948367 A    7/2017
(Continued)

OTHER PUBLICATIONS

Reales (WO 2013139816)—Machine Translation (Year: 2013).*

*Primary Examiner* — Brian Christopher Delrue
(74) *Attorney, Agent, or Firm* — Elevated IP, LLC

(57) ABSTRACT

A jacket type wind turbine foundation (jacket) for supporting a wind turbine tower comprises a jacket support structure configured to transfer loads from the tower to the seabed. A transition piece constituting the top part of the jacket is configured to transfer the loads and weight of the tower to a jacket support structure, having legs supported by a bracing system of cross members. Each leg is bolted to the transition piece, which comprises one or more cast transition piece segments, a floor, a centrally arranged entrance configured to allow access to the transition piece for staff and/or equipment, and one connection portion for each leg. Each connection portion is attached to a leg at a joint arranged at a level below the level of the floor of the transition piece.

20 Claims, 5 Drawing Sheets

(58) Field of Classification Search
CPC ....... E02D 27/42; E02D 27/52; E02D 27/425;
Y02B 10/30; Y02E 10/72
See application file for complete search history.

(56) References Cited

U.S. PATENT DOCUMENTS

| | | | | |
|---|---|---|---|---|
| 11,725,634 | B2* | 8/2023 | Hansen | F03D 13/10 |
| | | | | 290/44 |
| 2006/0267348 | A1* | 11/2006 | Weitkamp | F03D 13/20 |
| | | | | 290/55 |
| 2010/0293781 | A1* | 11/2010 | Foo | B66C 23/26 |
| | | | | 29/791 |
| 2012/0114414 | A1* | 5/2012 | Jang | E02D 29/14 |
| | | | | 264/255 |
| 2012/0263544 | A1* | 10/2012 | Oestergaard | E04H 12/10 |
| | | | | 29/525.08 |
| 2012/0263545 | A1* | 10/2012 | Oestergaard | E02B 17/0004 |
| | | | | 405/195.1 |
| 2014/0133921 | A1 | 5/2014 | Wu et al. | |
| 2014/0328632 | A1* | 11/2014 | Lefranc | B63B 27/143 |
| | | | | 405/227 |
| 2015/0056020 | A1* | 2/2015 | Bleasdale | E02B 17/0004 |
| | | | | 405/195.1 |
| 2015/0152664 | A1* | 6/2015 | Larsen | E04H 12/10 |
| | | | | 52/651.07 |
| 2015/0218796 | A1* | 8/2015 | Seidel | E02D 27/425 |
| | | | | 52/651.01 |
| 2016/0052606 | A1* | 2/2016 | Dekker | B63B 27/19 |
| | | | | 114/364 |
| 2017/0009480 | A1* | 1/2017 | Bucknell | E04H 12/10 |
| 2017/0298647 | A1 | 10/2017 | Bartminn et al. | |
| 2018/0135267 | A1* | 5/2018 | Reales Bertomeo | |
| | | | | E02B 17/0004 |
| 2019/0040844 | A1* | 2/2019 | Da Silva | F03D 13/25 |
| 2019/0249647 | A1* | 8/2019 | Lynderup | F03D 80/82 |
| 2019/0264661 | A1 | 8/2019 | Donescu et al. | |
| 2020/0072195 | A1* | 3/2020 | Rates Palau | F03D 9/25 |
| 2022/0025873 | A1* | 1/2022 | Hansen | F03D 13/10 |
| 2022/0260061 | A1* | 8/2022 | Skjaerbaek | F03D 13/20 |
| 2024/0052807 | A1* | 2/2024 | Macleay | F03D 13/25 |

FOREIGN PATENT DOCUMENTS

| | | | | |
|---|---|---|---|---|
| CN | 211547795 | U | 9/2020 | |
| DE | 202011101599 | U1 * | 11/2011 | ......... E02B 17/0004 |
| DE | 202015103351 | U1 * | 8/2015 | ............. B66B 9/00 |
| EP | 2751424 | A1 | 7/2014 | |
| EP | 4184006 | A1 * | 5/2023 | ............ F03D 13/10 |
| ES | 2887954 | T3 * | 12/2021 | ............ B63B 27/10 |
| WO | WO-2013139816 | A2 * | 9/2013 | ........ E02B 17/0004 |
| WO | 2014016166 | A1 | 1/2014 | |
| WO | 2018046205 | A1 | 3/2018 | |

\* cited by examiner

JACKET TYPE WIND TURBINE FOUNDATION AND METHODS FOR CONSTRUCTION THEREOF

CROSS-REFERENCE TO RELATED APPLICATIONS

This application is a continuation under 35 U.S.C. 111 of International Patent Application No. PCT/DK2021/050371, filed Dec. 16, 2021, which claims the benefit of and priority to Danish Application No. PA 2020 01409, filed Dec. 16, 2020, each of which is hereby incorporated by reference in its entirety.

FIELD OF INVENTION

The present invention relates to a jacket type wind turbine foundation. The present invention also relates to a method for constructing a jacket type wind turbine foundation.

BACKGROUND

The green transition has increased the focus on renewable energy produced using wind turbines, because wind turbines can create reliable, cost-effective, pollution-free energy. The foundation, however, is a basic challenge when it comes to offshore wind turbines.

In the prior art, jacket type wind turbine foundations are widely used, as they are suitable for deeper waters. A jacket type wind turbine foundation consists typically of a transition piece arranged and configured to transfer the loads and weight of the wind turbine tower and generator to the jacket support structure legs. The transition piece is the top part of the jacket.

A prior art jacket moreover comprises a work platform and boat landing area placed outside the transition piece. The work platform and boat landing area are arranged and configured to give access for installation and maintenance of the wind turbine.

A prior art jacket moreover comprises a jacket support structure configured to transfer loads from the turbine to the ground via support cables down to the seabed and to allow access to the turbine for maintenance and control.

A typical prior art jacket structure comprises a welded tubular space frame having legs supported by a bracing system built of cross members.

The prior art jackets are, however, heavy and expensive because a lot of costly weldable steel is required.

CN 106948367 A discloses an example of prior art jacket structures, wherein the jacket comprises a transition structure wherein the legs are bolted to a one-piece transition structure. Such transition structure is difficult to store and transport.

WO 2018046205 A discloses a jacket type wind turbine foundation for a tower with a transition piece. The transition piece is provided with an opening designed as an elevator shaft. It would, however, be advantageous to have an alternative that is less expensive to produce and requires a lower quantity of materials.

Thus, it would be desirable to have a simpler and cheaper alternative.

BRIEF DESCRIPTION

It is an object of the present invention to provide a jacket that is simpler and cheaper than prior art jackets.

A jacket according to the disclosure is a jacket type wind turbine foundation (jacket) for supporting a wind turbine tower, wherein the jacket comprises:
- a jacket support structure configured to transfer loads from the tower to the seabed, wherein the jacket support structure comprises legs supported by a bracing system built of cross members; and
- a transition piece constituting the top part of the jacket, wherein the transition piece is configured to transfer the loads and weight of tower to the jacket support structure, wherein the legs are bolted to the transition piece, wherein the transition piece comprises:
- a floor;
- a centrally arranged entrance arranged and configured to allow access to the transition piece for staff and/or equipment; and
- one connection portion for each leg, wherein each connection portion is attached to a leg in a joint,
- wherein the joints are arranged at a level below the level of the floor of the transition piece, wherein the transition piece comprises one or more cast transition piece segments, wherein the entrance is an opening provided in the floor of the transition piece.

Hereby, it is possible to provide a jacket that is simpler and cheaper than prior art jackets.

By replacing the traditional welded joints with cast components that are bolted together it is possible to achieve several advantages:
- It is possible to provide an alternative to the expensive critical weldings.
- It is possible to provide a large degree of modularity (mass-production of segments that are configured to be bolted together).
- It is possible to optimize the design of the segments in order to better distribute the loads (provide an improved load distribution).
- It is possible to provide segments having better mechanical properties as cast components have an advantage over welded segments with respect to fatigue issues.
- It is possible to provide integration of details and functions such as lifting points, access to the tower and transport interfaces.
- It is possible to reduce the weight of the construction.

A jacket according to the present disclosure is configured to support a wind turbine tower. The jacket is primarily intended for supporting a wind turbine tower of an offshore wind turbine.

A jacket support structure is configured to transfer loads from the tower to the seabed. In an embodiment, the jacket support structure is configured to be mounted on feet that are placed on the seabed. In an embodiment, the jacket support structure comprises feet that are configured to be placed on the seabed.

The jacket support structure comprises legs supported by a bracing system built of cross members.

In an embodiment, the jacket support structure comprises three legs.

In an embodiment, the jacket support structure comprises four legs.

In an embodiment, the jacket support structure comprises five or more legs.

A transition piece constitutes the top part of the jacket and is configured to receive the bottom portion of a wind turbine tower. The transition piece is configured to transfer the loads and weight of the tower to the jacket support structure.

In an embodiment, the transition piece comprises an inner portion defining an inner space. When a wind turbine tower is supported by the jacket, there is access to the inside portion of the tower through the inner space of the transition piece.

It is an advantage that the jacket comprises several cast building structures that are bolted together, wherein the legs are bolted to the transition piece. Hereby, traditional welded joints can be replaced by joints that are bolted together.

It is an advantage that the jacket comprises several cast building structures including legs that are mechanically attached to the transition piece by a bolted joint. Hereby, storing and transportation is eased. Moreover, assembling the jacket is easier.

In an embodiment, the cast building structures include legs and cross members that are bolted together. Hereby, storing and transportation is eased. Moreover, assembling the jacket is easier.

In an embodiment, the cast building structures include legs and cross members that are welded together.

In an embodiment, the transition piece is segmented into a plurality of transition piece segments that are bolted together. Hereby, storing and transportation is eased. Moreover, assembling the jacket is easier.

In an embodiment, the transition piece is segmented into a plurality of transition piece segments that are welded together.

By providing a centrally arranged entrance in the transition piece, it is possible to have access to the inside structure of the transition piece. This makes it possible to access the tower and thus to transport replacement parts into the tower through the entrance. Moreover, personnel can easily access the tower supported by the jacket. Since the transition piece is formed by one or more cast segments, it is possible to optimize the design in order to save material and hereby reduce the cost of the transition piece.

In an embodiment, the centrally arranged entrance is arranged and configured to allow access to the transition piece for staff and/or equipment.

In an embodiment, the transition piece is segmented into a plurality of cast transition piece segments that are bolted together. Accordingly, the transition piece comprises several cast segments that are bolted together. If the transition piece is large, it may be an advantage to produce several transition piece segments because the casting process can be accomplished using smaller tools.

In an embodiment, the transition piece comprises several cast segments each having interface portions (the areas designed to bear against an adjacent segment), wherein the interface portions are provided in oversize. Hereby, it is possible to process (remove material from) some of the interface portions in order to make adjacent interface portions fit.

In an embodiment, the legs and cross members are bolted together.

In an embodiment, the entrance is circular.

In an embodiment, the entrance is oval.

In an embodiment, the entrance is rectangular.

In an embodiment, the entrance is centrally arranged.

In an embodiment, the entrance is square.

It may be an advantage that a railing at least partly surrounds the entrance. Hereby, personal and equipment can be prevented from falling out through the entrance.

In an embodiment, a railing surrounds the entrance.

In an embodiment, a railing surrounds at least 300 degrees of the 360 degrees of the entrance.

In an embodiment, the distal portion of each connection portion protrudes downwardly from the transition piece and extends parallel to the longitudinal axis of the leg to which the connection portion is attached. Hereby, it is possible to optimize the strength of the connection portions and hereby transfer forces to the legs in a safe manner.

In an embodiment, the proximal portion of each connection portion protrudes radially from the transition piece, wherein the angle between horizontal and the longitudinal axis of the proximal portion of each connection portion is in the range 20-60 degrees.

In an embodiment, the proximal portion of each connection portion protrudes radially from the transition piece, wherein the angle between horizontal and the longitudinal axis of the proximal portion of each connection portion is in the range 25-55 degrees.

In an embodiment, the proximal portion of each connection portion protrudes radially from the transition piece, wherein the angle between horizontal and the longitudinal axis of the proximal portion of each connection portion is in the range 30-50 degrees.

In an embodiment, the jacket comprises a work platform and boat landing area placed outside the transition piece. Hereby, it is possible to access the work platform and boat landing area when travelling by boat.

In an embodiment, the work platform and boat landing area are provided with a railing to improve the safety of personnel using the work platform and boat landing area.

In an embodiment, a sliding system comprising one or more tracks is provided at the work platform and boat landing area.

In an embodiment, the work platform and boat landing area comprise a horizontal platform structure, wherein the sliding system is provided with the one or more tracks that extends horizontally along a portion of the platform structure.

In an embodiment, the one or more tracks extend through an area provided straight below the entrance. Hereby, it is possible to slide objects along the one or more tracks into a position, at which the objects are placed below the entrance. From this position the objects can be lifted up through the entrance and hereby enter the interior portion of the transition piece.

In an embodiment, a container module is arranged at the work platform and boat landing area.

In an embodiment, the entrance comprises a door.

In an embodiment, the entrance comprises a door provided with a centrally arranged opening. Hereby, it is possible to use the door for transportation of articles that are larger than a man. At the same time, the centrally arranged opening of the door provides access to the inner space of the transition piece for personnel.

In an embodiment, the entrance is arranged and shaped in such a manner that entering the entrance includes a vertical displacement.

In an embodiment, the entrance is arranged and shaped in such a manner that entering the entrance can be done by a vertical displacement only.

In an embodiment, the entrance is designed to allow personnel and components to enter.

In an embodiment, the entrance is arranged at the lower portion of the transition piece.

In an embodiment, the entrance is arranged at the lower half (the half to which the legs are attached) of the transition piece.

In an embodiment, a separate platform is provided for each joint between adjacent leg segments or the transition piece. Hereby, it is possible to service the joints.

The jacket according to the present disclosure applies cast components in critical areas of the jacket. The jacket requires fewer components than prior art jackets. Moreover, a simpler manufacturing procedure can be applied.

In an embodiment, the jacket comprises no critical weldings.

The jacket according to the present disclosure can be produced at a lower cost and it is possible to produce the jacket in a faster manner than prior art jackets.

In an embodiment, one or more of the components of the jacket comprises integrated lifting structures. Hereby, it is easier to handle the components of the jacket.

A method according to the present disclosure is a method for constructing a jacket type wind turbine foundation (jacket) for supporting a wind turbine tower, wherein the method comprises the following steps:
- providing a jacket support structure configured to transfer loads from the tower to the seabed, wherein the jacket support structure comprises legs supported by a bracing system built of cross members;
- providing a transition piece constituting the top part of the jacket, wherein the transition piece is configured to transfer the loads and weight of the tower to the jacket support structure, wherein the method comprises the following steps:
a) providing a transition piece that comprises:
   a floor;
   a centrally arranged entrance arranged and configured to allow access to the transition piece; and
   one connection portion for each leg; and
b) attaching each connection portion to a leg in a joint, wherein the joints are arranged at a level below the level of the floor of the transition piece, wherein the transition piece comprises one or more cast transition piece segments, wherein the entrance is an opening provided in the floor of the transition piece.

Hereby, it is possible to provide a jacket that is simpler and cheaper than prior art jackets.

In an embodiment, the entrance is constructed in such a manner that it provides access to the transition piece for staff.

In an embodiment, the entrance is constructed in such a manner that it provides access to the transition piece for equipment that is used in the tower.

In an embodiment, the method comprises the following steps:
- casting several segments configured to be assembled to form the transition piece; and
- bolting together the segments.

In an embodiment, the method comprises the step of bolting each connection portion to a leg.

In an embodiment, the method comprises the step of providing a railing at least partly surrounding the entrance.

In an embodiment, a railing surrounds the entrance.

It is an advantage that the transition piece is segmented into a plurality of cast transition piece segments, wherein the method comprises the step of bolting together the cast transition piece segments.

In an embodiment, the transition piece is segmented into a plurality of cast transition piece segments and the method comprises the step of welding together the transition piece segments.

In an embodiment, the method comprises the step of providing a transition piece that comprises several cast transition piece segments each having interface portions (the areas designed to bear against an adjacent segment), wherein the interface portions are provided in oversize, wherein the method comprises the steps of:
a) processing (removing material from) some of the interface portions in order to make adjacent interface portions fit; and
b) attaching the transition piece segments to each other to form the transition piece.

BRIEF DESCRIPTION OF THE DRAWINGS

Inventions disclosed herein will become more fully understood from the detailed description given herein below. The accompanying drawings are given by way of illustration only, and thus, they are not limitative. In the accompanying drawings.

DETAILED DESCRIPTION

Figures 1A, 1B:
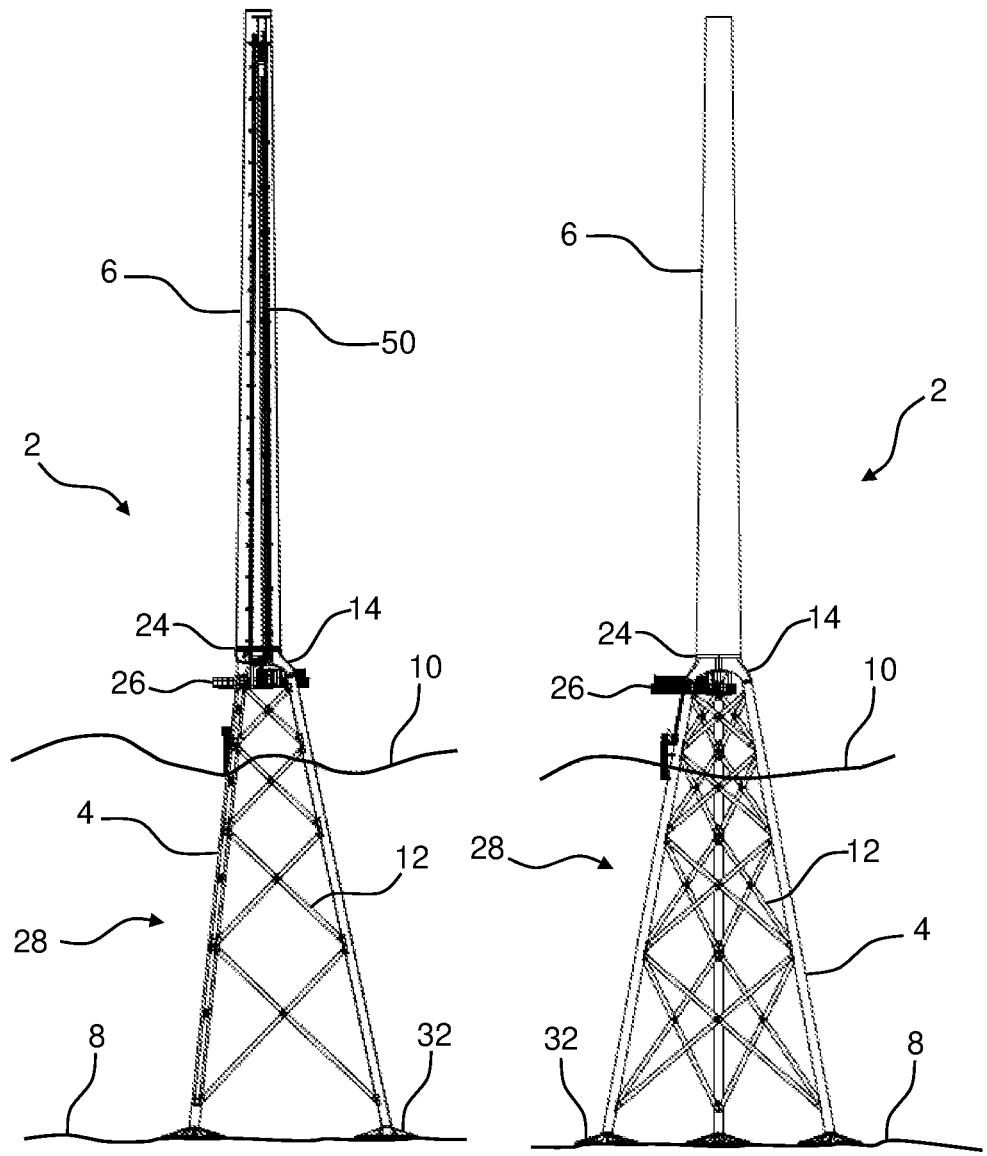
FIG. 1A shows a side view of a jacket according to an embodiment.
FIG. 1B shows a cross-sectional side view of the jacket shown in FIG. 1A.

Referring now in detail to the drawings for the purpose of illustrating embodiments of the present disclosure FIG. 1A is a side view of a jacket 2 according to an embodiment. The jacket 2 comprises a jacket support structure 28 that is placed on feet 32 that are arranged on the seabed 8. The water level 10 is indicated and it can be seen that a major portion of the jacket support structure 28 is submerged into water.

The jacket support structure 28 comprises three legs 4 that are mechanically connected to each other by a plurality of cross members 12 that constitute a lattice structure. In a prior art jacket construction, the cross members 12 are attached to the legs by welding. In the jacket 2, however, the cross members 12 are bolted to the legs.

It can be seen that the jacket 2 tapers towards its top portion. A transition piece 14 is attached to the top portion of the jacket support structure 28. The transition piece 14 is bolted to the top portion of the jacket support structure 28.

A work platform and boat landing area 26 is provided at the transition piece 14. The work platform and boat landing area 26 extend from the central area of the transition piece 14 and protrude horizontally from there.

A wind turbine tower 6 is attached to the transition piece 14 of the jacket 2. The tower 6 is attached to the transition piece 14 at a joint 24. The tower 6 is bolted to the transition piece 14.

FIG. 1B illustrates a cross-sectional side view of the jacket 2 shown in FIG. 1A. It can be seen that several electrical cables 50 extend from the top portion of the tower 6 to the bottom portion of the tower 6.

Figure 2A:
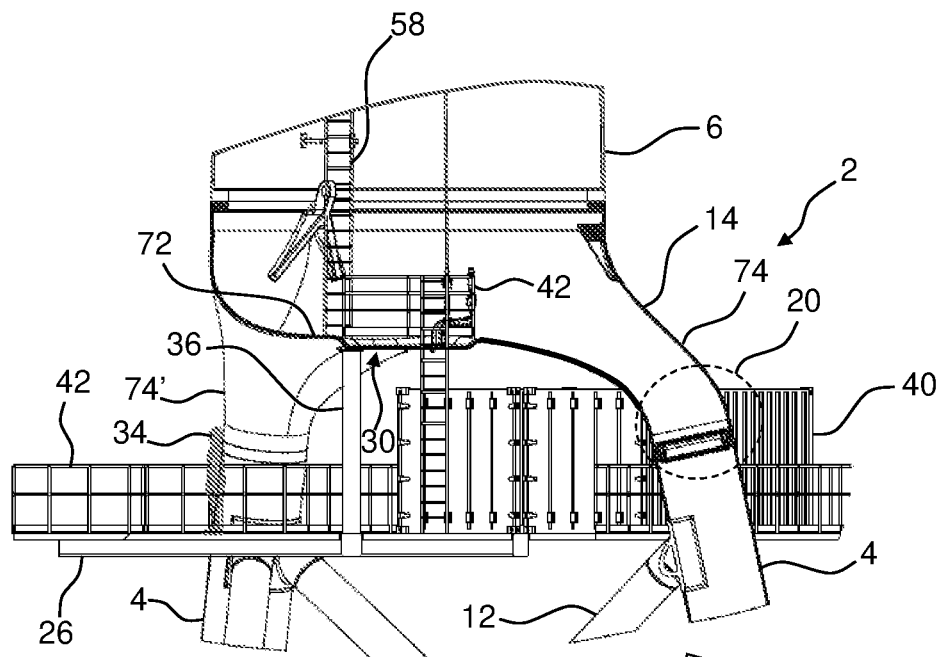
FIG. 2A shows a cross-sectional view of a transition piece of a jacket according to an embodiment.
Figure 2A:

FIG. 2A illustrates a cross-sectional view of a transition piece 14 of a jacket 2 according to an embodiment. The transition piece 14 comprises an inner space, from which there is access to a ladder 58. A wind turbine tower 6 is supported by and attached to the transition piece 14. The transition piece 14 is attached to legs 4 by joints 20. The joints are established by bolts used to bolt the legs 4 and the transition piece 14 together. It can be seen that cross members 12 are bolted to the legs 4.

A work platform and boat landing area 26 is attached to the transition piece 14. In an embodiment, the work platform and boat landing area 26 is attached to the transition piece 14 by connection structures shaped as steel girders or steel bars 36 extending between the transition piece 14 and the work platform and boat landing area 26.

A person 34 is standing on the work platform and boat landing area 26. A railing 42 surrounds the work platform and boat landing area 2 to prevent personnel from falling.

A container module 40 is provided in the right-side end of the work platform and boat landing area 26. The container module 40 can be used to store equipment and spare parts.

The transition piece 14 comprises several cast transition piece segments that are bolted together. In another embodiment, the transition piece 14 may be provided as a one-piece cast body.

The transition piece 14 comprises a centrally arranged entrance 30 that is arranged and configured to allow access to the transition piece 14. The entrance 30 provides access for staff and/or equipment.

The transition piece 14 comprises a floor 72 that can be accessed when entering through the entrance 30.

The transition piece 14 comprises one connection portion 74, 74' for each leg 4. Each connection portion 74, 74' is attached to a leg 4 to form a joint 20. It can be seen that the joints 20 are arranged at a level below the level of the floor 72 of the transition piece 14.

A railing 42 surrounds (at least a part of) the entrance 30. The railing 42 prevents personnel and equipment from falling out through the entrance 30.

Figure 2B:
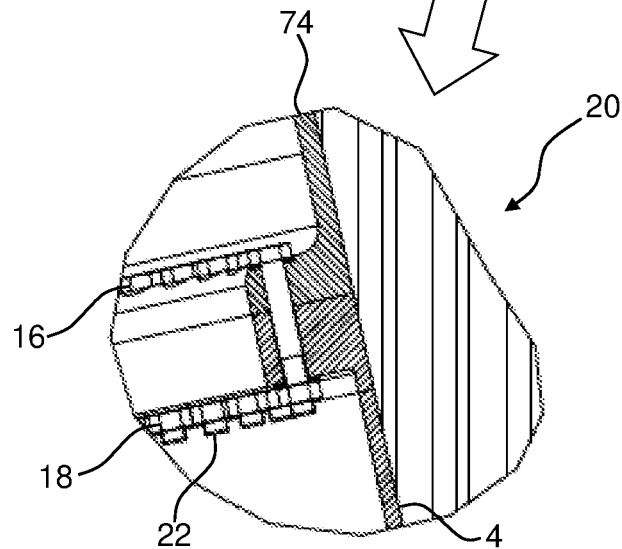
FIG. 2B shows a close-up view of a joint between the transition piece shown in FIG. 2A and a leg of a jacket support structure of the jacket.

FIG. 2B illustrates a close-up view of a joint 20 indicated in FIG. 2A. The joint 20 is used to provide a mechanical attachment between the transition piece 14 and leg 4 shown in FIG. 2A. The joint 20 is a bolted joint, in which bolts 22 are used to bolt together a first structure 16 of the transition piece 14 and a second structure 18 of the leg 4.

It can be seen that the connection portion 74 of the transition piece is attached to the leg 4 in the joint 20.

Figure 3:
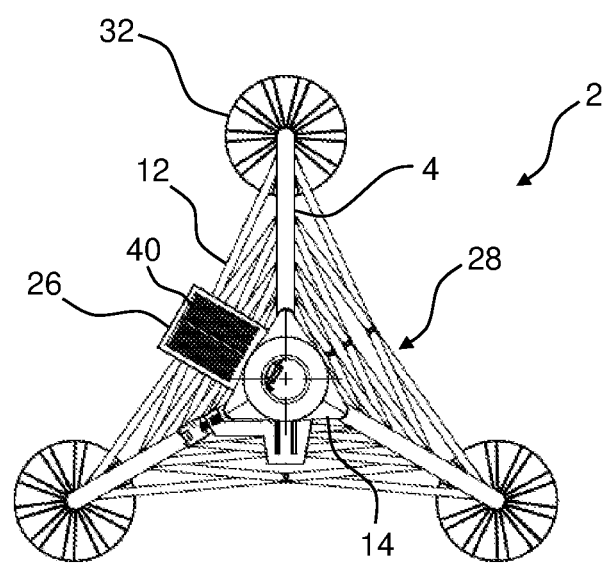
FIG. 3 shows a top view of the jacket shown in FIG. 1A.

FIG. 3 illustrates a top view of the jacket 2 shown in FIG. 1A. The jacket 2 comprises a jacket support structure 28 that is placed on feet 32 that are configured to be arranged on a seabed. The jacket 2 comprises a transition piece 14 that is attached to the top portion of the jacket support structure 28. The jacket support structure 28 comprises three legs 4 that are mechanically connected to each other by a plurality of cross members 12 constituting a lattice structure. The cross members 12 are bolted to the legs 4.

A work platform and boat landing area 26 is provided at the transition piece 14. The work platform and boat landing area 26 extends from the central area of the transition piece and protrudes horizontally from here. A container module 40 is placed on the work platform and boat landing area 26.

Figure 4:
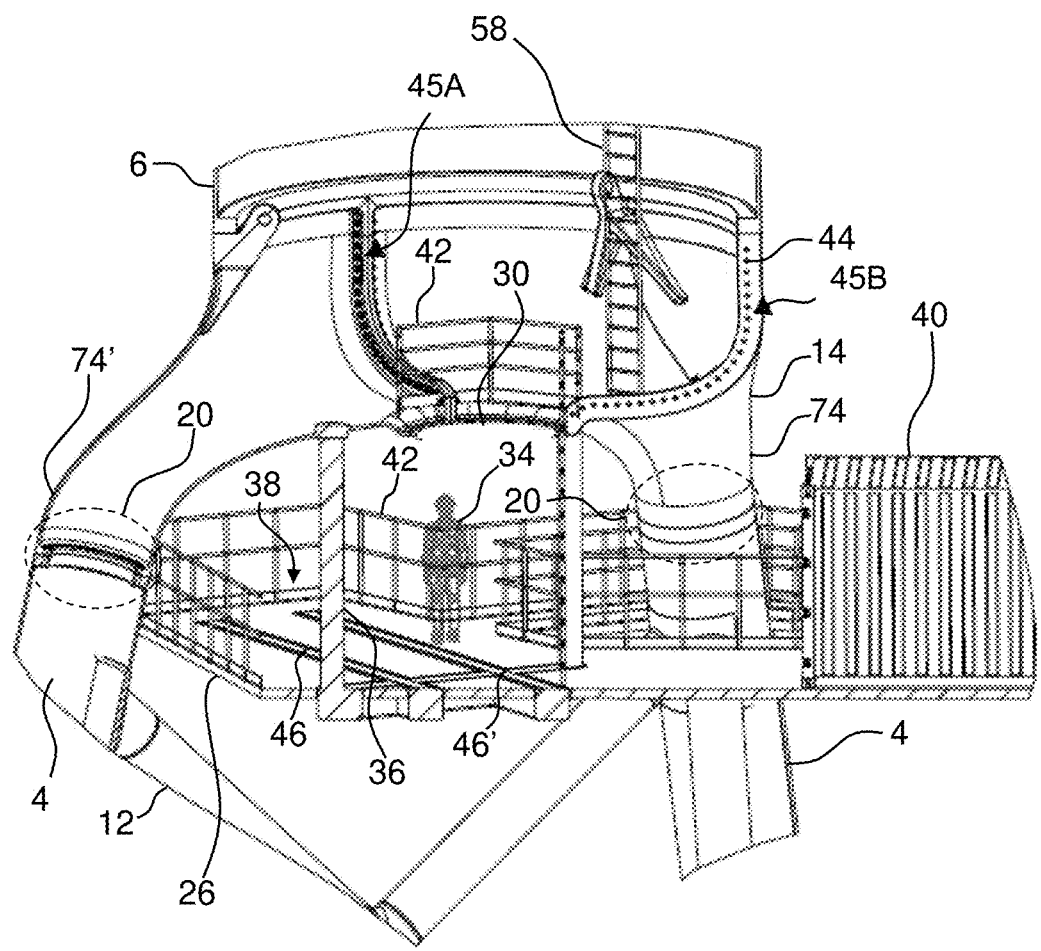
FIG. 4 shows a cross-sectional view of a transition piece of a jacket according to an embodiment.

FIG. 4 illustrates a cross-sectional view of a transition piece 14 of a jacket 2 according to an embodiment. The transition piece 14 has an entrance 30 and an inner space providing access to a ladder 58, by which personnel can access the higher sections of a wind turbine tower 6 that is supported by and attached to the transition piece 14.

The transition piece 14 is mechanically connected to legs 4 by joints 20. Each joint 20 is a bolted joint 20. Accordingly, the legs 4 and the transition piece 14 are bolted together. Moreover, cross members 12 are bolted to the legs 4.

The jacket 2 comprises a work platform and boat landing area 26. The work platform and boat landing area 26 is attached to the transition piece 14 by connection structures comprising bars 36 extending between the transition piece 14 and the work platform and boat landing area 26. The connection structures constitute a U-shaped mounting construction. The work platform and boat landing area 26 comprises a plate-shaped platform suitable for use as a working and transport section.

A person 34 is standing on the platform surrounded by a railing 42 to prevent personnel from falling. It can be seen that a container module 40 is provided at the right-side end of the work platform and boat landing area 26. The container module 40 makes it possible to store equipment and spare parts.

The work platform and boat landing area 26 comprises a sliding system 38. The sliding system 38 comprises tracks 46, 46' arranged to allow equipment and objects to be transported along the tracks 46, 46' e.g. by using a slide vehicle configured to be moved along the tracks 46, 46'.

It can be seen that the tracks 46, 46' extend through an area provided straight below the entrance 30. Hereby, it is possible to slide objects along the tracks 46, 46' into a position, at which the objects are placed below the entrance 30. From this position the objects can be lifted up through the entrance 30 and hereby enter the interior portion of the transition piece 14.

The transition piece 14 comprises a plurality of segments joined to one another along seams 45A, 45B extending from the flange at joint 24 to the entrance 30. A plurality of holes 44 are exposed because one segment of the transition piece 14 has been removed (for illustrative purposes) to expose the seams 45A, 45B. The holes 44 are arranged on the seams 45A, 45B and configured to receive bolts so that the segments of the transition piece 14 can be bolted together.

A railing 42 surrounds a portion of the entrance 30. Hereby, the railing 42 prevents personnel from falling out through the entrance 30.

The transition piece 14 comprises one connection portion 74, 74' for each leg 4. Each connection portion 74, 74' is attached to a leg 4 via a joint 20. It can be seen that the joints 20 are arranged at a level below the level of the floor of the transition piece 14.

Figure 5:
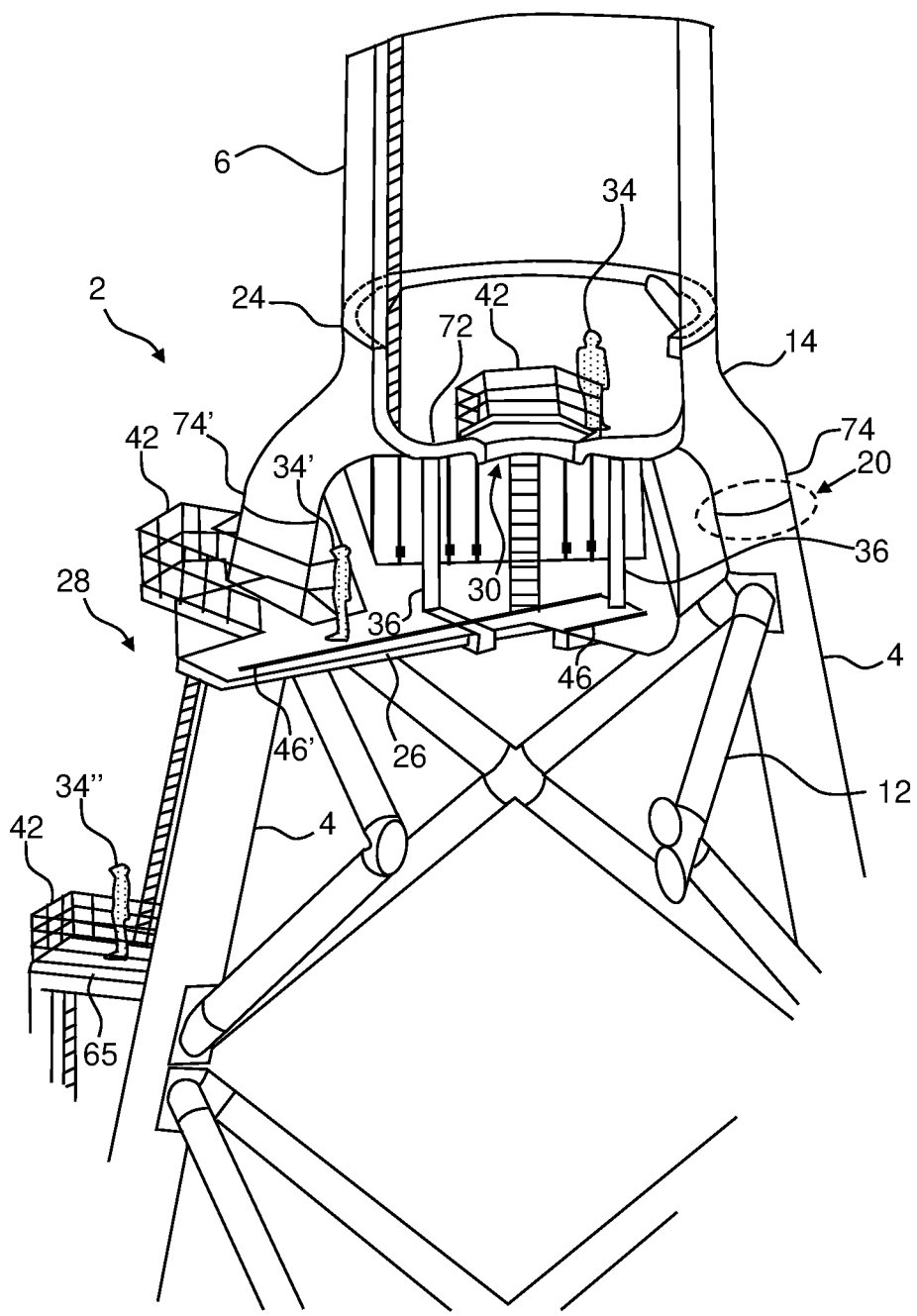
FIG. 5 shows a cross-sectional side view of a jacket according to an embodiment.

FIG. 5 illustrates a cross-sectional side view of a jacket 2 according to an embodiment. The jacket comprises a jacket support structure 28.

The jacket 2 comprises a jacket support structure 28 that comprises legs 4 that are mechanically connected to each other by a plurality of cross members 12. The cross members 12 constitute a lattice structure. The cross members 12 are bolted to the legs 4.

The jacket 2 tapers towards its top portion, at which a transition piece 14 is provided. The transition piece 14 is bolted to the top portion of the jacket support structure 28. The tower 6 is attached to the transition piece 14 at a joint 24. The tower 6 is bolted to the transition piece 14.

A work platform and boat landing area 26 is attached to the transition piece 14. The work platform and boat landing area 26 extends from the central area of the transition piece 14 and protrudes laterally from the remaining part of the jacket support structure 28. The work platform and boat landing area 26 is attached to the transition piece 14 by connection structures 36. The connection structures 36 may be shaped as tubular structures or bars by way of example.

A person 34' is standing on the work platform and boat landing area 26. A railing 42 prevents the person 34' from falling overboard.

An additional platform 65 is attached to one of the legs of the jacket support structure 28. A person 34" stands on this platform 65 and is protected from falling overboard by a railing 42. The platform 65 is connected to the work platform and boat landing area 26 through a ladder extending between the platform 65 and the work platform and boat landing area 26. In an embodiment, a separate platform 65 is provided for each joint between adjacent leg segments. Hereby, it is possible to service the joints.

A centrally arranged entrance 30 is provided at the transition piece 14. A person 34 has entered the inner space in the transition piece 14 through the entrance 30. A railing 42 surrounds a portion of the entrance 30. Hereby, the railing 42 prevents the person 34 from falling through the entrance 30.

The transition piece 14 comprises one connection portion 74, 74' for each leg 4. Each connection portion 74, 74' is attached to a leg 4 via a joint 20. It can be seen that the joints 20 are arranged at a level below the level of the floor 72 of the transition piece 14.

Two parallel tracks 46, 46' are provided at the work platform and boat landing area 26. The tracks 46, 46' extend through an area provided straight below the entrance 30. Accordingly, it is possible to slide objects along the tracks 46, 46' into a position, from which the objects are placed below the entrance 30. From this position the objects can be lifted up through the entrance 30 and hereby enter the interior portion of the transition piece 14.

Inside the inner space of the transition piece 14, there is access to a ladder 58.

LIST OF REFERENCE NUMERALS

2 Jacket
4 Leg
6 Tower
8 Seabed
10 Water level
12 Cross member
14 Transition piece
16 First structure
18 Second structure
20 Joint
22 Bolt
24 Joint
26 Work platform and boat landing area
28 Jacket support structure
30 Entrance
32 Foot
34, 34', 34" Person
36 Connection structure
38 Sliding system
40 Container module
42 Railing
44 Hole
46, 46' Track
58 Ladder
65 Platform
72 Floor
74, 74' Connection portion

What is claimed is:

1. A transition piece for a jacket type wind turbine foundation for supporting a wind turbine tower, the transition piece comprising:

a top opening surrounded by a flange for joining the transition piece with a wind turbine tower;
one or more walls extending away from the top opening and forming a cavity having a floor;
an entrance in the floor permitting access to the cavity; and
a plurality of connection portions each extending away from the floor and the top opening for joining with a leg of a jacket support structure;
wherein the transition piece comprises a plurality of segments joined to one another along seams extending from the flange to the entrance.

2. The transition piece according to claim 1, wherein each connection portion comprises a male or female distal end for insertably mating with the leg of the jacket support structure to form a joint.

3. The transition piece according to claim 2, wherein the joint is disposed below a level of the floor.

4. The transition piece according to claim 1, wherein the connection portions extend laterally and longitudinally away from the floor and the top opening.

5. The transition piece according to claim 4, wherein the work platform is disposed between the plurality of connection portions.

6. The transition piece according to claim 1, further comprising a work platform below the floor.

7. The transition piece according to claim 6, wherein the work platform comprises a pair of tracks for sliding equipment underneath the entrance in the floor.

8. The transition piece according to claim 1, wherein a centerpoint of a surface defining the top opening and a centerpoint of a surface defining the entrance are laterally aligned.

9. The transition piece according to claim 1, wherein a plane aligned with one of the seams bifurcates one of the connection portions disposed opposite the one seam.

10. The transition piece according to claim 1, wherein the plurality of segments consists of three segments and the plurality of connection portions consists of three connection portions, and wherein each of the connection portions is disposed opposite one of the seams.

11. A jacket type wind turbine foundation (jacket) for supporting a wind turbine tower, wherein the jacket comprises:

a jacket support structure configured to transfer loads from the tower to a seabed, wherein the jacket support structure comprises legs supported by a bracing system built of cross members; and
a transition piece constituting a top part of the jacket, wherein the transition piece is configured to transfer the loads and weight of the tower to the jacket support structure,
wherein the legs are bolted to the transition piece, wherein the transition piece comprises:
a top opening surrounded by a flange and one or more walls extending away from the top opening forming a cavity having a floor;
a centrally arranged entrance arranged and configured to allow access to the transition piece for staff and/or equipment; and
one connection portion for each of the legs, wherein each connection portion is attached to one of the legs by a joint,
wherein the joint is arranged at a level below a level of the floor of the transition piece, wherein the transition piece comprises a plurality of transition piece segments joined to one another along seams extending from the flange to the entrance, wherein the entrance is an opening provided in the floor of the transition piece.

12. The jacket according to claim 11, wherein the entrance is circular.

13. The jacket according to claim 11, wherein a railing at least partly surrounds the entrance.

14. The jacket according to claim 11, wherein a distal portion of each connection portion protrudes downwardly from the transition piece and extends parallel to a longitudinal axis of the leg to which the connection portion is attached.

15. The jacket according to claim 11, wherein a proximal portion of each connection portion protrudes radially from the transition piece, wherein an angle between horizontal and a longitudinal axis of a proximal portion of each connection portion is in a range of 20-60 degrees.

16. The jacket according to claim 11, wherein the entrance comprises a door provided with a centrally arranged opening.

17. The jacket according to claim 11, further comprising a work platform and boat landing area below the floor.

18. A method for constructing a jacket type wind turbine foundation (jacket) for supporting a wind turbine tower, wherein the method comprises:
  providing a jacket support structure configured to transfer loads from the tower to a seabed, wherein the jacket support structure comprises legs supported by a bracing system built of cross members;
  providing a transition piece constituting a top part of the jacket, wherein the transition piece is configured to transfer the loads and weight of the tower to the jacket support structure, the transition piece comprising:
    a top opening surrounded by a flange and one or more walls extending away from the top opening forming a cavity having a floor;
    a centrally arranged entrance arranged and configured to allow access to the transition piece; and
    one connection portion for each of the legs; and
  attaching each of the connection portions to one of the legs via a joint, wherein the joint is arranged at a level below a level of the floor of the transition piece, wherein the transition piece comprises a plurality of transition piece segments joined to one another along seams extending from the flange to the entrance, and wherein the entrance is an opening provided in the floor of the transition piece.

19. The method according to claim 18, further comprising:
  casting several of the transition piece segments configured to be assembled to form the transition piece; and
  bolting together the transition piece segments.

20. The method according to claim 18, further comprising bolting each of the connection portions to one of the legs.

* * * * *